(12) United States Patent
Steen et al.

(10) Patent No.: US 8,645,033 B2
(45) Date of Patent: Feb. 4, 2014

(54) ENGINE DRIVEN VEHICLE WITH TRANSMISSION

(75) Inventors: Marcus Steen, Angered (SE); Anders Eriksson, Göteborg (SE); Magnus Blanckenfjell, Göteborg (SE); Anders Lindgren, Hisings Karra (SE)

(73) Assignee: Volvo Lastvagnar AB, Göteborg (SE)

( * ) Notice: Subject to any disclaimer, the term of this patent is extended or adjusted under 35 U.S.C. 154(b) by 1395 days.

(21) Appl. No.: 11/575,665

(22) PCT Filed: Sep. 9, 2005

(86) PCT No.: PCT/SE2005/001319
§ 371 (c)(1),
(2), (4) Date: Sep. 18, 2010

(87) PCT Pub. No.: WO2006/036099
PCT Pub. Date: Apr. 6, 2006

(65) Prior Publication Data
US 2011/0054748 A1 Mar. 3, 2011

(30) Foreign Application Priority Data

Sep. 28, 2004 (SE) ........................ 0402371

(51) Int. Cl.
*F16H 59/36* (2006.01)
(52) U.S. Cl.
USPC .............................. 701/58; 701/54
(58) Field of Classification Search
USPC .......... 701/58, 51, 52, 54, 61, 55; 477/15, 54, 477/120, 900, 901
See application file for complete search history.

(56) References Cited

U.S. PATENT DOCUMENTS 3,703,109 A * 11/1972 Irie et al. ................. 477/139
4,789,936 A    12/1988 Kurihara et al.
(Continued)

FOREIGN PATENT DOCUMENTS

| DE | 4440706 A1 | 5/1996 |
| DE | 10106935 A  | 8/2002 |
| DE | 10235969 A1 | 2/2004 |
| WO | 02055909 A  | 7/2002 |

OTHER PUBLICATIONS

Supplementary European Search Report for corresponding European App. EP 05 77 7953, pp. 1-7.

(Continued)

*Primary Examiner* — Marthe Marc-Coleman
(74) *Attorney, Agent, or Firm* — WRB-IP LLP

(57) ABSTRACT

An engine driven vehicle includes at least one engine, and control devices that are arranged to control a transmission that is driven by the engine. The control devices are arranged to receive at least two sets of data, each set including at least one of a first signal that includes information about the gradient of the surface on which the vehicle is being driven sent from a first sensor, and at least one second signal that includes information about the vehicle's speed sent from a second sensor, and at least one third signal that includes information about the vehicle's acceleration. The control devices are also arranged to calculate at least one of two different resistance to travel constants $k_1$ and $k_2$, in response to the first, second and third signals, and to control the transmission in response to at least one of the constants $k_1$ and $k_2$.

12 Claims, 5 Drawing Sheets

(56) References Cited

U.S. PATENT DOCUMENTS

| | | | |
|---|---|---|---|
| 4,941,365 A | 7/1990 | Reiner et al. | |
| 5,406,862 A * | 4/1995 | Amsallen | 74/336 R |
| 5,479,345 A | 12/1995 | Amsallen | |
| 5,557,519 A | 9/1996 | Morita | |
| 5,611,748 A * | 3/1997 | Kashiwabara | 477/47 |
| 5,611,753 A * | 3/1997 | Kondo et al. | 477/118 |
| 5,928,107 A * | 7/1999 | Bieber | 477/97 |
| 6,243,638 B1 * | 6/2001 | Abo et al. | 701/51 |
| 6,446,024 B1 | 9/2002 | Leimbach et al. | |
| 6,671,601 B2 * | 12/2003 | Abiru | 701/51 |
| 2002/0104903 A1 * | 8/2002 | Eckstein et al. | 239/542 |
| 2003/0125862 A1 * | 7/2003 | Horiguchi | 701/65 |
| 2003/0143957 A1 | 7/2003 | Lyon | |

OTHER PUBLICATIONS

International Search Report from corresponding International application PCT/SE2005/001319, pp. 1-2.

International Search Report from corresponding International application PCT/SE2005/001319; pp. 1-7 Date: Mar. 28, 2011.

* cited by examiner

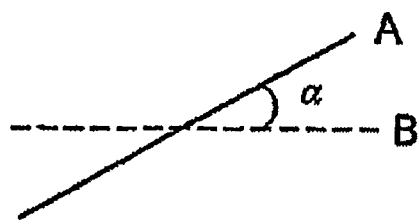
Fig. 3a
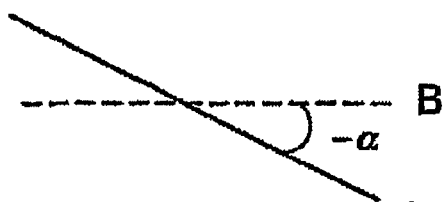
Fig. 3b
| First gear, G1 ||||
|---|---|---|---|
| [i] | Acceleration a(i) [$m/s^2$] | Gradient of road S(i) [rad] | Speed V(i) [m/s] |
| 1 | a(1) | S(1) | V(1) |
| 2 | a(2) | S(2) | V(2) |
| 3 | a(3) | S(3) | V(3) |
| ⋮ | ⋮ | ⋮ | ⋮ |
| N | a(N) | S(N) | V(N) |
Fig. 3c

ENGINE DRIVEN VEHICLE WITH TRANSMISSION

BACKGROUND AND SUMMARY

The present invention relates to a motor vehicle comprising an engine and control devices that are arranged to control a transmission that is driven by the engine.

The invention also relates to a method for controlling the vehicle's transmission comprising the determination of the vehicle's resistance to travel.

The invention also relates to a computer program for carrying out the said method.

In vehicles with automatic planetary gearing-based gearboxes with torque-converter or automatic stepping gearboxes, it is important to use as accurate an estimation as possible of the vehicle's resistance to travel—in order to be able to provide optimal gear changing regimes according to certain given criteria, such as, for example, low fuel consumption or high average speed.

A disadvantage of the known technology is the difficulty of controlling the transmission automatically when the vehicle is being driven in changing environments. For example, the weather can cause changes in the characteristics of the surface on which the vehicle is being driven, or the vehicle's speed or external wind can cause a reduction in the accuracy in implementing a predetermined gear change strategy.

U.S. Pat. No. 4,941,365 describes a system for calculating the resistance to travel, where the acceleration is calculated by measuring the speed on two occasions with the clutch disconnected.

It is desirable to provide a motor vehicle in which a better estimation of the vehicle's resistance to travel is obtained.

It is desirable to obtain in a cost-effective way a better basis for controlling the transmission.

According to an aspect of the present invention, an engine driven vehicle comprises at least an engine, control devices arranged to control a transmission driven by the engine, which control devices are arranged to receive at least two sets of data, each set comprising at least one of a first signal that comprises information about the gradient of the surface on which the vehicle is being driven sent from a first sensor, and at least one second signal that comprises information about the vehicle's speed sent from a second sensor, and at least one third signal that comprises information about the vehicle's acceleration, characterized in that the control devices are also arranged to calculate at least one of two different resistance to travel constants $k_1$ and $k_2$, where $k_1$ is a rolling resistance constant and $k_2$ is an air resistance constant; in response to the first, second and third signals, and to control the transmission in response to at least one of the constants $k_1$ and $k_2$.

A third sensor is preferably arranged to send the third signal. Alternatively, the control devices are arranged to calculate and send the third signal in response to the second signal. Each of the two sets of data is preferably different and each is provided with a unique time stamp.

At least one of the constants is preferably calculated by solving a system of equations, which system of equations comprises the two sets of data.

The information in each of the two sets of data preferably represents values for when the vehicle's propulsive force is 0 (zero).

The said calculation is preferably carried out in response to predetermined information, which said information comprises acceleration due to gravity and vehicle mass.

In this way, a more reliable gear selection is obtained for control of the transmission, which indirectly provides a number of other advantages, such as increased comfort of the driver, less load on the engine and less wear on the vehicle's transmission.

A more reliable gear selection is obtained in particular in situations where the vehicle's air resistance and rolling resistance are abnormally high, such as at high vehicle speeds, with strong headwinds or on wet surfaces. In particular, a more certain gear selection is obtained according to the invention when the vehicle is being driven at a low speed on a steep gradient or at a high speed on a flat surface.

According to the invention, by utilizing components and sensors that are already in the vehicle, more correct information is obtained that can be used as the basis for making decisions for control of the transmission in a cost-effective way.

In addition, according to the invention, better performance of the vehicle while it is being driven is being driven is obtained, as control of the transmission is based on more correct information. The vehicle can thus, for example, be driven in a more fuel-efficient way.

BRIEF DESCRIPTION OF THE DRAWINGS

FIG. 3a shows schematically how the gradient of a surface on which a vehicle is being driven is defined according to an embodiment of the invention.

FIG. 3b shows schematically how the gradient of a surface on which a vehicle is being driven is defined according to an embodiment of the invention.

FIG. 3c shows a table of measured and calculated data that is used for estimating resistance to travel according to an embodiment of the invention.

DETAILED DESCRIPTION

Figure 1:
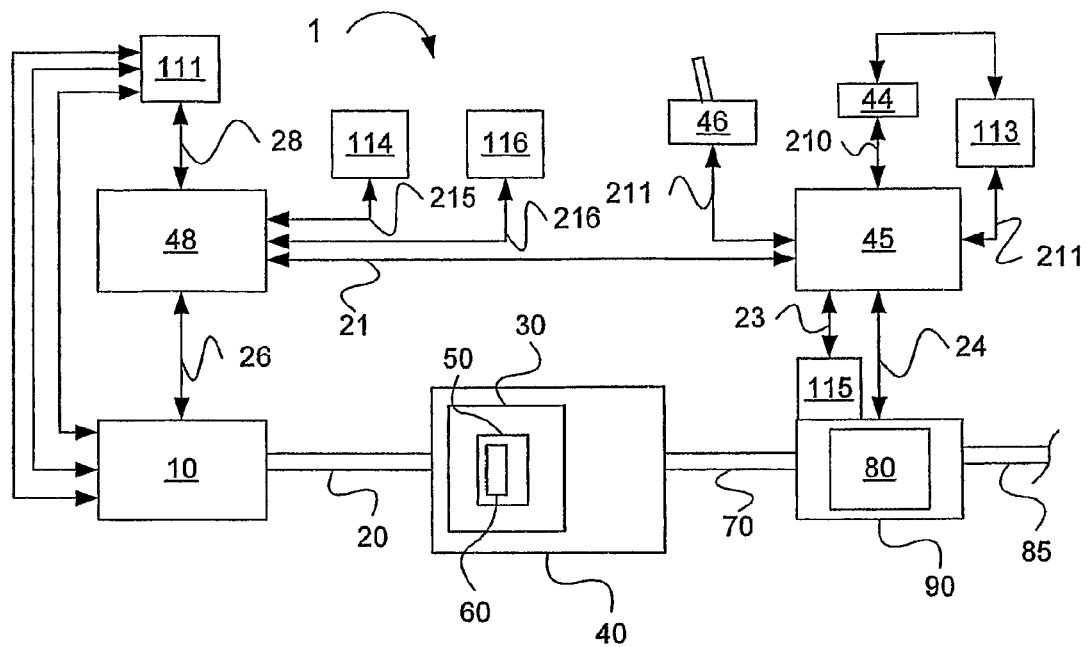
FIG. 1 shows a schematic illustration of an engine driven vehicle and a control system for the same.

FIG. 1 shows a schematic illustration of a vehicle 1 and a control system for the same according to an embodiment of the present invention in which 10 represents an engine, for example a six-cylinder diesel engine, the crankshaft 20 of which is connected to a single-disc dry disc clutch represented in general by 30, which is enclosed in a clutch case 40. Instead of a single-disc clutch, a double-disc clutch can be used. The crankshaft 20 is connected to the clutch case 50 of the clutch 30 in such a way that it cannot rotate, while its disc 60 is connected to an incoming shaft 70 in such a way that it cannot rotate, which shaft is mounted in the housing 80 of a gearbox represented in general by 90 in such a way that it can rotate. A main shaft and an intermediate shaft are mounted in the housing 80 in such a way that they can rotate. An outgoing shaft 85 from the gearbox 90 is arranged to drive the vehicle's wheels.

In addition, a first control unit 48 for control of the engine 10 and a second control unit 45 for control of the transmission 90 are illustrated. The first and second control units are arranged to communicate with each other via a cable 21. It is described in the following that different processes and method steps are carried out in the second control unit 45, but it should be apparent that the invention is not restricted to this, but that the first control unit 48 can similarly be used, or a combination of the first and second control units. The second control unit 45 is arranged to communicate with the transmission 90 via a cable 24. The first control unit 48 is arranged to communicate with the engine 10 via a cable 26. The first and second control units can, in general, be designated as control devices.

The vehicle 1 has a throttle 44 and a manual gear selector 46, which are arranged to communicate with the second control unit 45 via a cable 210 and 211 respectively. The gear selector 46 can have a position for manual change of gear and a position for automatic change of gear in the vehicle. The throttle can be an accelerator pedal. A sensor 113 is arranged to measure continually the position of the throttle. The sensor 113 is arranged to communicate with the second control unit 45 via a cable 212. The position of the throttle indicates implicitly the quantity of fuel that is supplied to the engine's combustion chamber. The quantity of fuel supplied indicates the engine torque. The second control unit 45 can thus continually calculate a value representing the engine torque on the basis of a signal sent from the sensor 113.

Detectors 111 are arranged to detect, measure, estimate or record different states of, among other things, the engine 10. The detectors can be of different kinds Examples of detectors are engine torque sensors I11a and engine output sensors 111b. In FIG. 1, detectors are only shown in general represented by 111. The detectors 111 are arranged to communicate with the first control unit 48 by means of a cable 28.

In addition, an acceleration sensor 114 is already arranged to detect the vehicle's acceleration a. The acceleration sensor 114 is arranged to detect continually the momentary vehicle acceleration a(i) and to communicate these values to the first control unit 48 via a cable 215. In the first control unit 48, a detected acceleration value a is paired with a time stamp R(i). The designation a(i) represents measured acceleration at the time (i), which time is indicated by the time stamp R(i). Time stamps R(i) are generated by the first control unit 48. Alternatively, a measured momentary acceleration a is supplied with a corresponding time stamp R(i) in the acceleration sensor 114, after which the acceleration value with time stamp a(i) is sent to the first control unit 48.

According to an embodiment, the acceleration sensor 114 is arranged to send signals representing the vehicle's acceleration continually to the second control unit 45 via the first control unit 48.

A gradient sensor 115 is already arranged in association with the gearbox 90. According to an embodiment, the gradient sensor 115 is already arranged in the gearbox 90. The gradient sensor 115 is arranged to measure the gradient of the surface on which the vehicle 1 is located. The surface can be a road, the gradient of which is measured. The gradient sensor 115 can be of piezo-electrical type. The gradient sensor 115 is arranged to communicate with the second control unit 45 via a cable 23. According to an embodiment, the gradient sensor 115 is arranged to send signals representing the gradient of the surface continually to the second control unit 45.

According to another embodiment, signals representing the gradient of the surface are sent to the second control unit at certain intervals, for example at intervals of 0.01 seconds or 0.5 seconds.

According to an embodiment, signals representing the gradient of the surface, the vehicle's acceleration and the vehicle's speed are sent continually to the second control unit 45 in which they are stored in an array together with respective time stamps. The array is stored in the second control unit 45. The array is also referred to as a table. FIG. 3c below describes such a table.

According to an embodiment, values S(i) representing the gradient of the surface are measured by means of the gradient sensor 115 each 100th millisecond (0.1 s) and each measured value is stored with a respective corresponding time stamp R(i). The time stamps R(i) are generated by the second control unit 45, where i is an integer, for example 1000. Table 1 below shows an example of four initial measurements for the transmission's first and lowest gear. Corresponding measurements can be carried out for all of the transmission's gears and can be stored in dedicated files in the second control unit.

TABLE 1

Measured gradient of the surface on which the vehicle is being driven S(i) with respective time stamp R(i).

| (i) | S(i) [rad] | R(i) [s] |
|---|---|---|
| 1 | S(1) | 0.1 |
| 2 | S(2) | 0.2 |
| 3 | S(3) | 0.3 |
| 4 | S(4) | 0.4 |

In a corresponding way as for gradient of the surface on which the vehicle is being driven S(i), the vehicle's acceleration is measured and recorded by the acceleration sensor 114 and is provided with corresponding time stamps R(i). The vehicle's acceleration is stored in Table 2 as shown below.

TABLE 2

Measured vehicle acceleration a(i) with respective time stamp R(i).

| (i) | A(i) [rad] | R(i) [s] |
|---|---|---|
| 1 | a(1) | 0.1 |
| 2 | a(2) | 0.2 |
| 3 | a(3) | 0.3 |
| 4 | a(4) | 0.4 |

In a similar way, a speed detector 116 that is arranged to communicate with the first control unit 48 via a cable 216 detects the vehicle's speed and communicates this value in the form of a signal. The vehicle's speed is stored in a Table 3 as shown below.

TABLE 3

Measured vehicle speed V(i) with respective time stamp R(i).

| (i) | V(i) [rad] | R(i) [s] |
|---|---|---|
| 1 | V(1) | 0.1 |
| 2 | V(2) | 0.2 |
| 3 | V(3) | 0.3 |
| 4 | V(4) | 0.4 |

According to an embodiment, the vehicle's acceleration is calculated on the basis of the vehicle's speed. This thus makes it possible to use only one sensor instead of two for obtaining the vehicle's acceleration and speed.

It should be noted that S(I), V(I) and a(I) are measured essentially simultaneously, and form a first data group (i=1) measured after 0.1 seconds (R(I)). S(2), V(2) and a(2) are measured essentially simultaneously, and form a second data group (i=2) measured after 0.2 seconds (R(2)).

The vehicle's mass m can be obtained in various ways. One way is to measure bellows pressure in the vehicle, whereby an approximate value representing the vehicle's mass m can be obtained. According to another way, the vehicle's mass can be entered manually by the driver and stored in the second control unit. According to yet another way, the vehicle's mass can be calculated in the second control unit continually, and at least certain values are then stored in the second control unit. Alternatively, one or more values representing the vehicle's mass m that are already stored in the second control unit are used.

It is generally known that $$F_D - F_R = ma \qquad (1)$$

where FD is the vehicle's total propulsive force and where FR is the total resistive force that, according to an embodiment of the invention, is given by equation 2 below.

$$F_R = mg \sin(\alpha) + k_1 m + k_2 V^2 \qquad (2)$$

in which
$k_1$ is a rolling resistance constant;
$k_2$ is an air resistance constant;
m is the vehicle's mass;
g is the acceleration due to gravity;
V is the vehicle's speed; and
$\alpha$ is the gradient of the surface on which the vehicle is being driven. An alternative designation for $\alpha$ is S. S(i) is thus a designation for an $\alpha$ that is related to a particular time stamp R(i).

If $F_D$ is set to 0 (zero), (1)+(2) gives:

$$0 = ma + mg \sin(\alpha) + k_1 m + k_2 V^2 \qquad (3)$$

Setting $F_D$ to 0 (zero) can, in practice, mean that a measurement is carried out when the vehicle's clutch is disconnected. An alternative to a disconnected clutch can be for the gear box to be disconnected. If $\alpha$(S), V and a are measured or calculated, according to the above, for two different speeds (different [i]), the two unknown constants $k_1$ and $k_2$ can be calculated.

Calculation example

Assume that the times [i] and [i+4] are used in the calculation, where i=1. A system of equations is then obtained with two unknowns as follows:

$$0 = ma[1] + mg \sin(\alpha[1]) + k_1 m + k_2 V^2 \qquad [1]$$

$$0 = ma[5] + mg \sin(a[5]) + k_1 m + k_2 V^2 \qquad [5]$$

Thus, for given values for the vehicle mass m and the acceleration due to gravity g, $k_1$ and $k_2$ can be calculated by solving the system of equations. The calculation is carried out in the second control unit.

It should be apparent that, according to an embodiment of the present invention, one of $k_1$ and $k_2$ is first calculated and is then used in the calculation of the second constant. This means that the first calculated constant can also be used separately for controlling the vehicle's transmission. The two constants $k_1$ and $k_2$ can thus be used separately for controlling the vehicle's transmission.

The calculated values $k_1$ and $k_2$ can advantageously be used as the basis for a gear change strategy stored in the second control unit, $k_1$ and $k_2$ calculated according to the above provide a more accurate basis for controlling the vehicle's transmission.

The control of the transmission in response to $k_1$ and $k_2$ will not be described in greater detail here.

The value of g can be stored in the second control unit as a constant to be used in calculations according to the above. There can be five different values for the acceleration due to gravity $g_1$-$g_5$, from which, in the given circumstances, a best value, for example $g_3$, can be selected for calculating $k_1$ and $k_2$.

According to an embodiment of the invention, the first and the second data groups form the basis for the calculation of the constants $k_1$ and $k_2$ according to the above. According to a second embodiment, S(3), V(3), a(3) and S(4), V(4), a(4) form the basis for the calculation of the constants $k_1$ and $k_2$ with reference to the calculation example above. These can be designated as a third and a fourth data group respectively. Data groups with different time stamps can be used to calculate the constants $k_1$ and $k_2$. For example, a data group 20(R(20)) and a data group 55(R(55)) can be used with reference to the calculation example above.

Values representing the vehicle's acceleration a, the gradient of the surface on which the vehicle is being driven S and the vehicle's speed V can be communicated in the form of an electrical signal to the second control unit. The signals can alternatively be an optical signal. The signal can be analog or digital. The second control unit is arranged to convert the received signal in a suitable way, for example by means of an A/D converter (not shown in the figure).

Figure 2:
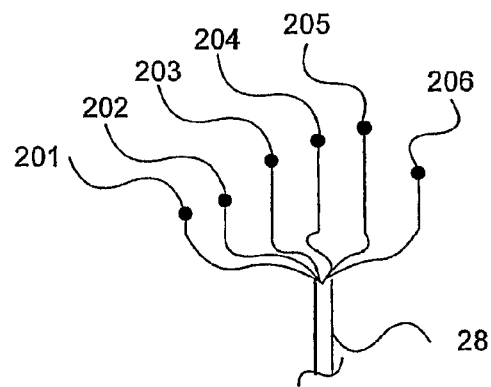
FIG. 2 shows a cable with examples of detected or calculated data, some of which is used according to the invention.

FIG. 2 shows the cable 28 and examples of motion data detected, measured, estimated or recorded by the detectors 111. Examples of motion data are, for example, engine torque 201, crankshaft torque 202, engine output 203, external wind conditions 204, exhaust gas back pressure 205 and fuel consumption 206.

In FIG. 3a, a broken line B illustrates a cross section of a horizontal plane. A solid line A illustrates a cross section of a flat surface that has a gradient of $\alpha$ radians relative to the horizontal plane B. The solid line A can typically represent a cross section of a flat road on which the vehicle 1 is being driven. In FIGS. 3a and 3b, it is assumed that the vehicle's direction of travel is from left to right. The flat surface A in FIG. 3a is thus an upward incline for the vehicle.

In FIG. 3b, in a corresponding way, a broken line B illustrates a cross section of a horizontal plane. A solid line A illustrates a cross section of a flat surface that has a gradient of a radians relative to the horizontal plane B. With the same assumptions as in FIG. 3a, the flat surface is thus a downward incline for the vehicle. It should be apparent that the gradient $\alpha$ is here minus (−)$\alpha$ radians relative to the horizontal plane B.

With reference to FIG. 3c, a table G1 is illustrated with entered data according to an embodiment of the invention.

The table shown in FIG. 3c comprises measured and calculated values for a first gear G1. According to an embodiment of the invention, there are corresponding tables for all the vehicle's gears. Thus, according to an embodiment, where the transmission has twelve different gears, there is a table for each of the transmission's twelve gears. Storage of data in the different tables is carried out as described above. The different tables are designated G1 to G12 for the respective gears. The table illustrated in FIG. 3c contains N rows that are stored. N is a positive integer. N can, for example, equal 50.

As made clear, it should be apparent that each of the tables G1-G12 contains N data groups. Alternatively, each of the tables G1-G12 has a different number of rows. Momentary detected values a(i), S(i) and V(i) are stored in the table of the measured data values for the vehicle's first gear. It should be noted that there can be several tables G1, and there can be several tables G2, etc. According to an embodiment, a table contains one measurement series. According to another embodiment, a table contains several measurement series. Measurement series means measurement values measured and calculated in a sequence for a particular gear for an essentially constant actual vehicle mass M.

According to an embodiment of the invention, a plurality of different values of $k_1$ and $k_2$ are calculated, whereby the respective mean value and/or standard deviation and/or median can be calculated. According to this embodiment, at least one of these calculated values (mean value and/or standard deviation and/or median) is then used as the basis for controlling the vehicle's transmission.

Figure 4A:
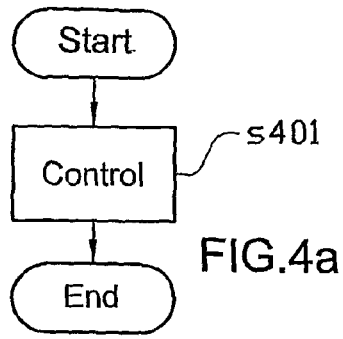
FIG. 4a shows a flow chart illustrating a method according to the invention.

FIG. 4a shows a flow chart illustrating a method for controlling the transmission of an engine driven vehicle according to an embodiment of the invention.

According to a first method step s401, the subsidiary steps are carried out of:
receiving a first signal comprising information about the gradient of the surface on which the vehicle is being driven; receiving a second signal comprising information about the vehicle's speed;
receiving a third signal comprising information about the vehicle's acceleration;
where the method is characterized by the steps of
calculating at least one of two resistance to travel constants $k_1$ and $k_2$ in response to the first, second and third signals comprising information; and of
controlling the vehicle's transmission in response to at least one of the two resistance to travel constants $k_1$ and $k_2$.

According to an embodiment of the invention, the method comprises the additional steps of:
receiving a signal comprising information about the acceleration due to gravity and the vehicle's mass; and of
calculating at least one of the two resistance to travel constants $k_1$ and $k_2$ in response to this information.

According to another embodiment of the invention, the method comprises the additional steps of:
receiving the first signal comprising information representing the gradient of the surface on which the vehicle is being driven at a first and a second time;
receiving the second signal comprising information representing the vehicle's speed at the first and the second times; and of
receiving the third signal comprising information representing the vehicle's acceleration at the first and the second times; with the first and the second times being different from each other.

According to yet another embodiment of the invention, the method comprises the additional step of:
calculating at least one of the two resistance to travel constants $k_1$ and $k_2$ by solving a system of equations.

According to an embodiment of the invention, the method comprises the additional step of:
calculating at least one of the two resistance to travel constants $k_1$ and $k_2$ for a vehicle's speed V that is greater than 50 km/h.

Figure 4C:
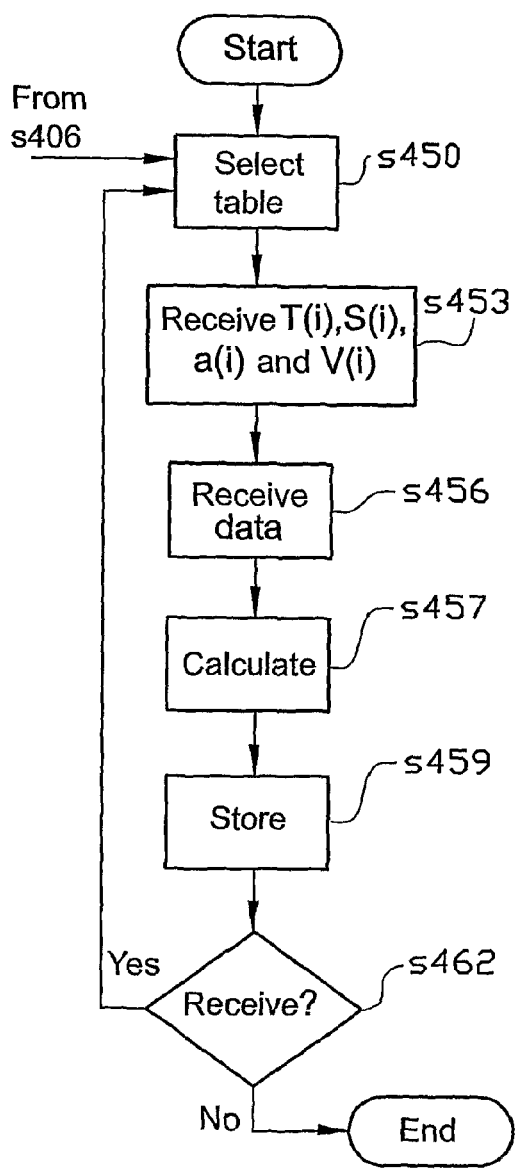
FIG. 4c shows a flow chart illustrating a method for calculating at least a part of the vehicle's resistance to travel according to an embodiment of the invention.
Figure 4B:
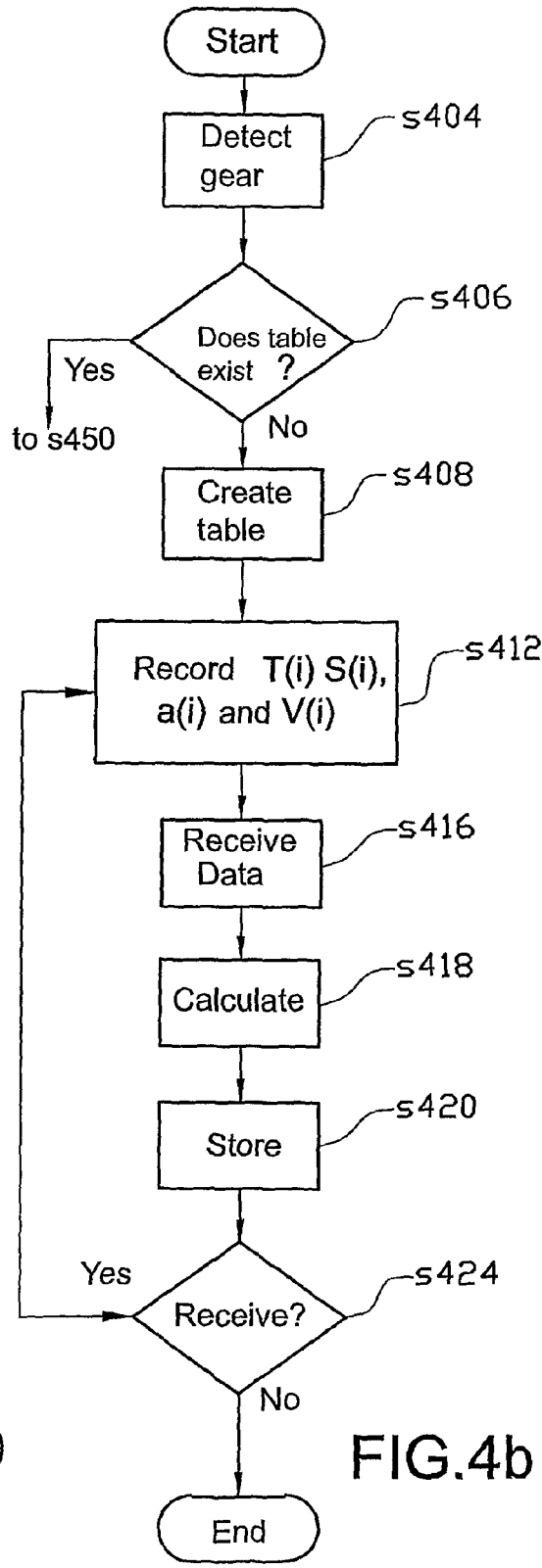
FIG. 4b shows a flow chart illustrating a method for calculating at least a part of the vehicle's resistance to travel according to an embodiment of the invention.

FIG. 4b shows a flow chart illustrating a method for calculating the constants $k_1$ and $k_2$ according to an embodiment of the invention. According to a first method step s404, it is detected in which gear the vehicle's transmission is.

In a subsequent method step s406, it is determined whether there is already a table for the detected gear. If such is the case, thus Yes, a method step s450 follows with reference to FIG. 4c. If a table has not already been created, thus No, a method step s408 follows.

In method step s408, a table is created intended for storing measured data, such as the gradient of the surface on which the vehicle is being driven S(i), the vehicle's acceleration a(i) and the vehicle's speed V(i). The table is intended to store measured or processed data relating to a specific gear in the vehicle's drive line, that is the gear that is detected in the method step s404. In this example, the detected gear is the gearbox's lowest gear, also called a first gear. According to this example, a created table is the one that is shown with reference to FIG. 3c, that is G1. The table is created and is stored in a memory in the second control unit 45. The table (4×N, where N is initially equal to 10) is empty after it has been created. The table is dynamic, that is more rows can be created as more measured data is stored. Additional rows in the table can be created automatically by the second control unit as received data is recorded. N is equal to the total number of rows in the table. N is a positive integer.

In a method step s412, the vehicle's acceleration a(i), the gradient of the surface on which the vehicle is being driven, which in this case is the gradient of the road α, designated S(i), and the vehicle's speed V(i) are recorded. Recorded values according to this method step have the same time stamp R(i). If, for example, R(i) is R(I), S(I), a(I) and V(I) are stored in a row in the table. After the method step s412, the method step s416 follows.

In the method step s416, a value is received representing the constants g and in that, in addition to the data that was recorded according to the previous method step s412, are included in the calculation of the resistance to travel and, in particular, for the determination of $k_1$ and/or $k_2$. The method step s416 is followed by a method step s418.

In the method step s418, $k_1$ and/or $k_2$ are calculated by solving a system of equations that was described above. S(i), a(i) and V(i) for two different times, when the vehicle's propulsive force is zero (0), and adequate values for g and m are used in the calculation of $k_1$ and/or $k_2$. The method step s418 is followed by a method step s420.

In the method step s420, the result of the calculation carried out in s418 is stored in a memory in the second control unit 45. $k_1$ and/or $k_2$ are thus stored in the second control unit. The method step s420 is followed by a method step s424.

In the method step s424, a decision is reached whether one of the above procedures is to be repeated, that is whether a new row containing new S(i), a(i) and V(i) for a subsequent time (i+1) is to be inserted in the table. If such is the case, that is "Yes", the method step s412 follows. If such is not the case, that is "No", the method is terminated. A program stored in the second control unit 45 controls the decision making in accordance with certain criteria.

In addition, a decision is reached whether stored information is to be deleted from the table. If such is the case, the information is deleted.

FIG. 4c shows a flow chart illustrating a method for calculating $k_1$ and $k_2$ according to an embodiment of the invention. According to the method step s450, a table that has already been created is selected that corresponds to the current gear in the vehicle's drive line. The selected table can, for example be G12 that corresponds to the vehicle's highest gear. The method step s450 is followed by a method step s453.

In the method step s453, S(i), a(i) and V(i) are received. The method step s453 is followed by a method step s45β.

In the method step s456, g and m are received. The method step s456 is followed by a method step s457.

In the method step s457, $k_1$ and/or $k_2$ are calculated by solving a system of equations as described above. S(i), a(i) and V(i) for two different times, when the vehicle's propulsive force is zero (0), and adequate values for g and m are used in the calculation of $k_1$ and/or $k_2$. The method step s457 is followed by a method step s459.

In the method step s459, the result $k_1$ and/or $k_2$ from the method step s457 is stored in a memory in the second control unit 45. The method step s459 is followed by a method step s462.

Figures 4D, 4E:
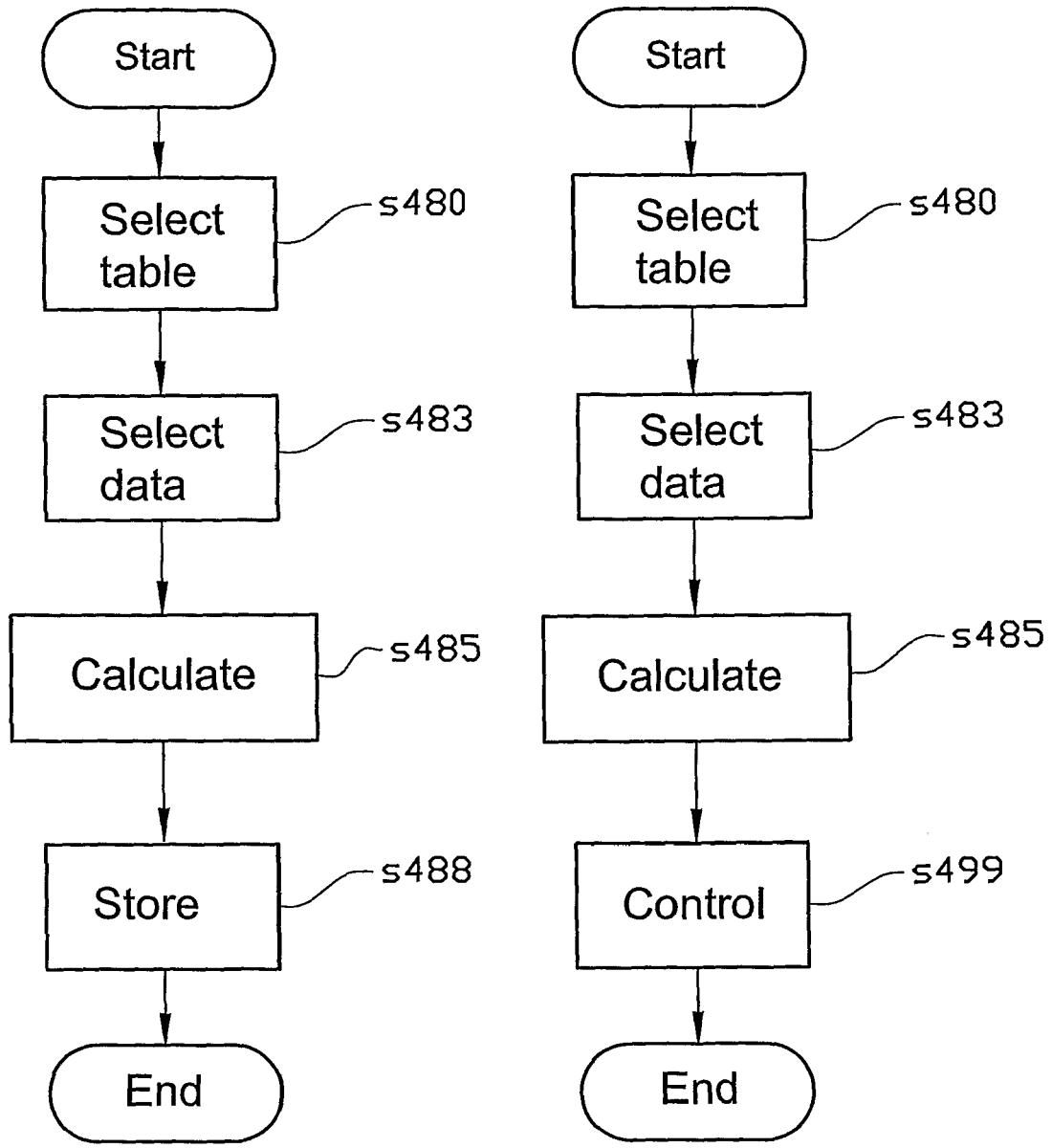
FIG. 4d shows a flow chart illustrating a method for calculating at least a part of the vehicle's resistance to travel according to an embodiment of the invention.
FIG. 4e shows a flow chart illustrating a method for controlling the vehicle's transmission according to an embodiment of the invention.

In the method step s462, a decision is reached whether one of the above procedures is to be repeated, that is whether a new row containing new S(i), a(i) and V(i) for a subsequent time (i+1) is to be inserted in the table. If such is the case, that is "Yes", the method step s450 follows. If such is not the case, that is "No", the method is terminated. A program stored in the second control unit 45 controls the decision making in accordance with certain criteria. FIG. 4d shows a flow chart illustrating a method for calculating k % and k2 according to an embodiment of the invention.

In the method step s480, one or more tables G1-G12 are selected. The method step s480 is followed by a method step s483.

In the method step s483, a number of calculated constants $k_1$ and $k_2$ are selected from the respective selected tables G1-G12. The selected constants can all be calculated for essentially the same load conditions, that is the actual vehicle mass M is essentially the same. However, the different calculated constants ki and k2 can thus be calculated for different gears in the vehicle's drive line and can accordingly be stored in different tables. The method step s483 is followed by a method step s485.

In the method step s485, the mean value is calculated of the selected calculated constants $k_1$ and $k_2$ in order to obtain a good approximation $\overline{k}_1$ and $\overline{k}_2$ for the constants $k_1$ and $k_2$. The method step s485 is followed by a method step s488.

In the method step s488, $\overline{k}_1$ and $\overline{k}_2$ are stored in the second control unit in order to be able to be used as the basis for a gear change strategy stored therein. After the method step s488, the method is terminated.

FIG. 4e shows a flow chart illustrating a method for controlling the vehicle's transmission according to an embodiment of the invention, in which the method steps s480 to s485 inclusive are the same as those described with reference to FIG. 4d. The method step s485 is followed by a method step s499.

In the method step s499, the vehicle's transmission is controlled in response to at least one of the calculated values $\overline{k}_1$ and $\overline{k}_2$ without first having been stored in a table. This is in order to implement a good estimation of the constants $k_1$ and $k_2$ as control information in an even more rapid way. After the method step s499, the method is terminated.

Figure 5:
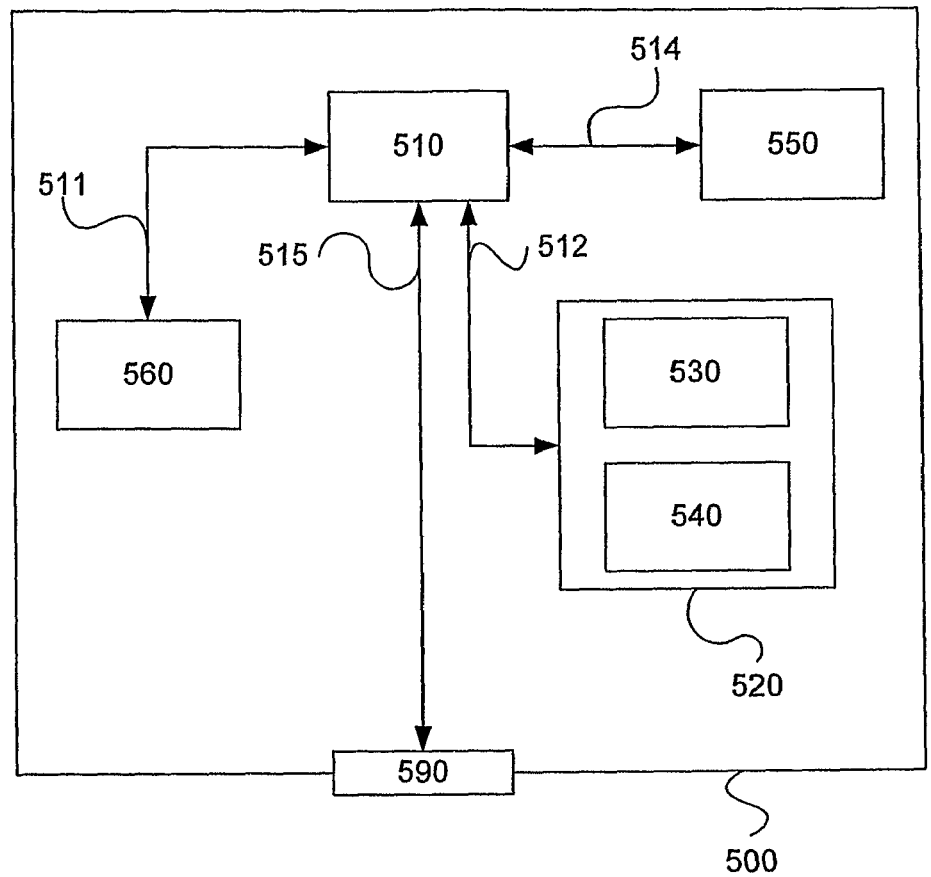
FIG. 5 shows schematically a computer device that is used according to an embodiment of the invention.

FIG. 5 shows an apparatus 500, according to an aspect of the invention, comprising a non-volatile memory 520, a data-processing unit 510 comprising a processor, and a read and write memory 560. The memory 520 has a first memory module 530, in which a computer program for controlling the apparatus 500 is stored. The computer program in the memory module 530 for controlling the apparatus 500 can be an operating system.

The apparatus 500 can be contained in, for example, a control unit, such as the control unit 45 or 48. According to a preferred embodiment, an apparatus 500 is incorporated in both the first and second control units, 45 and 48 respectively. The data-processing unit 510 can comprise, for example, a microcomputer.

The memory 520 has also a second memory module 540, in which a program is stored comprising methods with reference to the FIGS. 4a-4e. In an alternative embodiment, the program is stored on a separate non-volatile data-storage medium 550, such as, for example, a CD-ROM or a replaceable semiconductor memory. The program can be stored in an executable form or in a compressed state.

When it is described in the following that the data-processing unit 510 runs a special function, it should be clear that the data-processing unit 510 runs a special part of the program which is stored in the memory 540 or a special part of the program which is stored on the non-volatile recording medium 550. The data-processing unit 510 is arranged to communicate with the memory 550 by means of a data bus 514. The data-processing unit 510 is also arranged to communicate with the memory 520 by means of a data bus 512. In addition, the data-processing unit 510 is arranged to communicate with the memory 560 by means of a data bus 511. The data-processing unit 510 is also arranged to communicate with a data port 590 by means of a data bus 515.

The methods that are described in FIGS. 4a-e can be carried out by the data-processing unit 510 by means of the data-processing unit 510 running the program which is stored in the memory 540 or the program which is stored on the non-volatile recording medium 550.

In the second memory module 540, a computer program is stored comprising program code for carrying out method steps according to the flow charts, with reference to any one of the FIGS. 4a-e, when the said computer program is executed by a computer.

For utilization of the invention, there is a computer program product comprising program code stored on a medium that can be read by a computer for carrying out method steps according to the flow charts, with reference to any one of the FIGS. 4a-e, when the said computer program is executed by the computer.

For utilization of the invention, there is a computer program product that can be loaded directly into an internal memory in a computer, comprising a computer program for carrying out method steps according to the flow charts, with reference to any one of the FIGS. 4a-e, when the said computer program product is executed by the computer.

The invention claimed is:

1. An engine driven vehicle comprising:
at least one engine: and
control devices that are arranged to control a transmission that is driven by the engine, which control devices are arranged to receive at least two sets of data, each set comprising at least one of a first signal that comprises information about a gradient of a surface on which the vehicle is being driven it from a first sensor, and at least one second signal that comprises information about a speed of the vehicle sent from a second sensor, and at least one third signal that comprises information about acceleration of the vehicle, wherein the control devices arc also arranged to calculate at least one of two different resistance to travel, constants $k_1$ and $k_2$, where $k_1$ is a rolling resistance constant and $k_2$ is an air resistance constant, in response to the first, second and third signals, and to control the transmission in response to at least one of the constants $k_1$ and $k_2$, and where at least one of $k_1$ and $k_2$ is calculated by solving a system of equations, which system of equations comprises the two sets of data, and where the information in each of the two sets of data represents values for when a propulsive force of the vehicle is zero.

2. The engine driven vehicle as claimed in claim 1, wherein the two sets of data are different to each other.

3. The engine driven vehicle as claimed in claim 2, wherein the information in each of the two sets of data is provided with a unique time stamp.

4. The engine driven vehicle as claimed in claim 2, wherein the calculation is carried out in response to predetermined information, which information comprises acceleration due to gravity and vehicle mass.

5. The engine driven vehicle as claimed in claim 1, wherein the information in each of the two sets of data is provided with a unique time stamp.

6. The engine driven vehicle as claimed in claim 1, wherein the calculation is carried out in response to predetermined information, which information comprises acceleration due to gravity and vehicle mass.

7. A method for controlling the transmission of an engine driven vehicle, which method comprises the steps of
receiving a first signal comprising information about a gradient of a surface on which the vehicle is being driven;
receiving: a second signal comprising information about a speed of the vehicle;
receiving a third signal comprising information about acceleration of the vehicle;
calculating, using a control unit, at least one of two resistance to travel constants $k_1$ and $k_2$, where $k_1$ is a rolling resistance constant and $k_2$ is an air resistance constant, in response to the first, second and third signals comprising information; and
controlling the vehicle's transmission in response to at least one of the two resistance to travel constants $k_1$ and $k_2$ and
calculating at least one of the two resistance to travel constants $k_1$ and $k_2$ by solving a system of equations, which system of equations comprises the first, second and third information, and where the information represents values for when a propulsive force of the vehicle is zero.

8. The method as claimed in claim 7, comprising:
receiving a signal comprising information about acceleration due to gravity and mass of the vehicle; and
calculating at least one of the two resistance to travel constants $k_1$ and $k_2$ in response to the information about acceleration due to gravity and mass of the vehicle.

9. The method as claimed in claim 7, comprising:
receiving the first signal comprising information representing the gradient of the surface on which the vehicle is being driven at a first and a second time;
receiving the second signal comprising information representing the vehicle's speed at the first and the second times; and
receiving the third signal comprising information representing the vehicle's acceleration at the first and the second times and wherein the first and the second times are different from each other.

10. The method as claimed in claim 7, comprising:
calculating at least one of the two resistance to travel constants $k_1$ and $k_2$ for a vehicle's speed that is greater than 50 km/h.

11. A non-transient computer program product comprising a computer program for carrying out, when the computer program is executed by a computer, a method for controlling the transmission of an engine driven vehicle, which method comprises the steps of:
receiving a first signal comprising information about a gradient of a surface on which the vehicle is being driven;
receiving a second signal comprising information about a speed of the vehicle;
receiving a third signal comprising information about acceleration of the vehicle;
calculating at least one of two resistance to travel constants $k_1$ and $k_2$ in response to the first, second and third signals comprising information, where $k_1$ is a rolling resistance constant and $k_2$ is an air resistance constant; and
controlling the vehicles transmission in response to at least one of the two resistance to travel constants $k_1$ and $k_2$.

12. A non-transient computer program product comprising a computer program stored on a nontransient medium that can be read by a computer for carrying out, when the computer program is executed by the computer, a method for controlling the transmission of an engine driven vehicle, which method comprises the steps of:
receiving, a first signal comprising information about a gradient of a surface on which the vehicle is being driven;
receiving a second signal comprising information about a speed of the vehicle;
receiving, a third signal comprising information about acceleration of the vehicle;
calculating at least one of two resistance to travel constants $k_1$ and $k_2$ in response to the first, second and third signals comprising information, where $k_1$ is a rolling resistance constant and $k_2$ is an air resistance constant; and
controlling the vehicle's transmission in response to at least one of the two resistance to travel constants $k_1$ and $k_2$.

* * * * *